Nov. 13, 1962     J. B. FULLER ETAL     3,063,413
BIOLOGICAL-STUDY CAGE
Filed Aug. 3, 1960     3 Sheets-Sheet 2

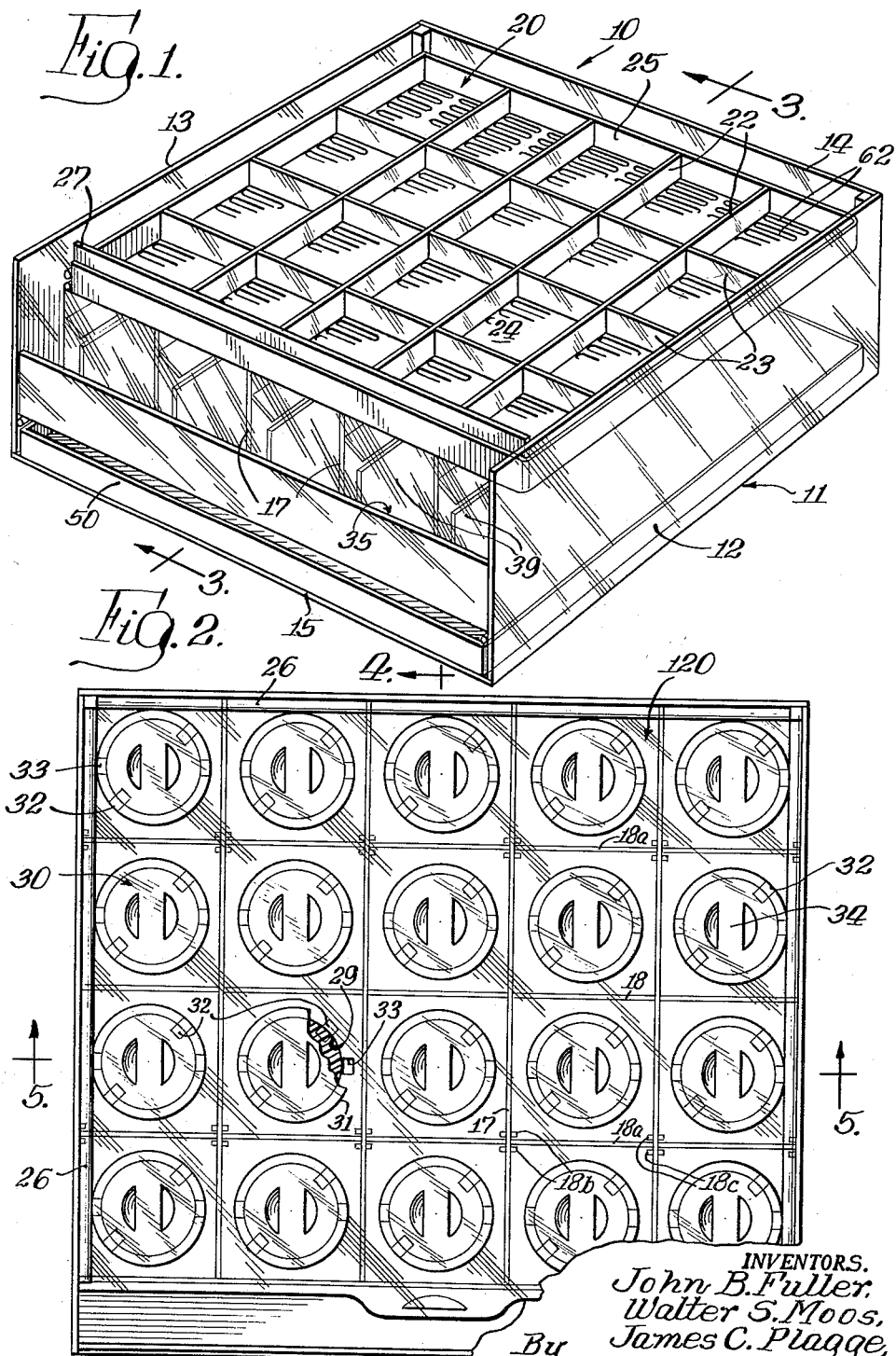

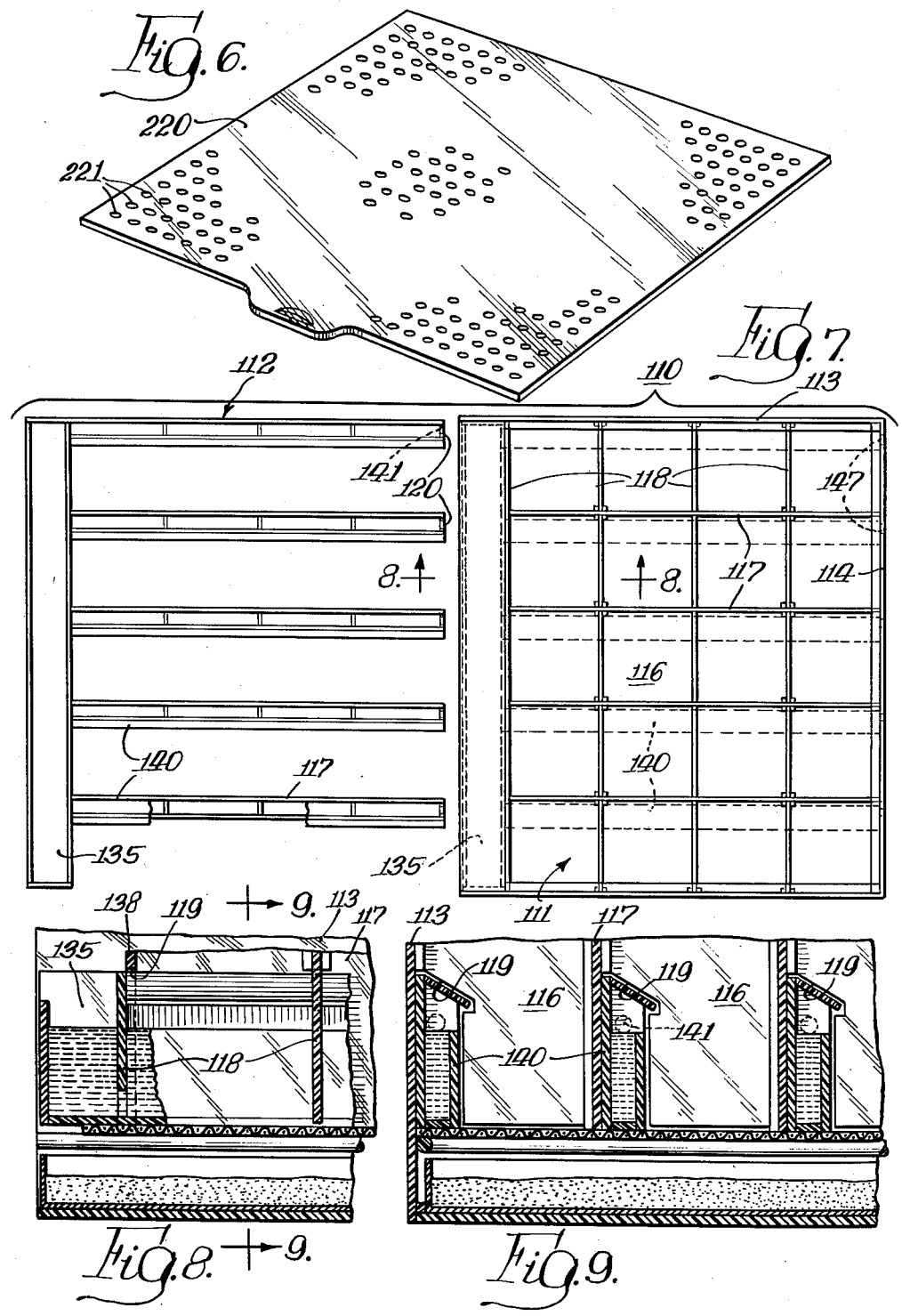

United States Patent Office 3,063,413
Patented Nov. 13, 1962

3,063,413
BIOLOGICAL-STUDY CAGE
John B. Fuller, 719 N. Kenilworth, Oak Park, Ill.;
Walter S. Moos, 903 Midway Road, Northbrook, Ill.;
and James C. Plagge, 211 N. Elmwood, Oak Park, Ill.
Filed Aug. 3, 1960, Ser. No. 47,255
17 Claims. (Cl. 119—18)

This invention relates to cages and in particular to cages for housing individually animals such as mice for use in making biological studies thereof.

In performing certain biological studies of animals such as mice, e.g., studies of the effect of radiation thereon, nutritional experiments of all kinds, drug therapy experiments, and surgical experiments such as involving removal or transplanting of organs, separate housing of the animals is a desideratum. Illustratively, in radiation studies, it is necessary to maintain uniform dosimetric conditions. Heretofore, such radiation studies have been accomplished by irradiating the individual mice separately or by placing a number of the mice in one cage during the irradiation. To handle the mice individually requires an excessive amount of time where a substantial number of animals are studied, and to treat the mice in groups in a common cage effectively precludes uniformity of irradiation as a result of the tendency of mice to bunch together especially when sick or moribund. Where the mice are housed together in one cage during such biological studies, fighting and cannibalism may occur introducing extraneous factors such as casualties and injuries to the mice, reducing the significance of the observations. The cannibalism problem is particularly acute directly after surgical operations. Again, in such common housing, infections may be readily transmitted from one animal to another, thereby further reducing the significance of the observations. In making metabolic studies wherein food consumption and analysis of the excreta of the individual animals must be accurately determined, it is similarly essential that the animals be individually housed.

A principal object of the present invention is the provision of a new and improved biological-study cage for use with animals such as mice.

Another object of the invention is the provision of such a cage arranged to house the animals individually.

A further object of the invention is the provision of such a cage having new and improved means for feeding the housed animals individually.

Still another feature is the provision of such a cage having new and improved means for housing the animals to permit uniform irradiation of each of the plurality thereof.

A still further object is to provide such a cage having new and improved means for collecting the excreta of the animals individually as for use in metabolic studies thereof.

Still another object is to provide such a cage arranged for facilitated controlled access to each housing space within the cage.

A yet further object is to provide such a cage having new and improved means for providing drinking water to the individual housing spaces.

Other features and advantages of the invention will be apparent from the following description taken in connection with the accompanying drawing wherein:

FIG. 1 is an isometric view of a biological-study cage embodying the invention;

FIG. 2 is a plan view thereof, with a portion broken away for facilitated illustration thereof, and with an irradiation cover substituted for the feeding cover of FIG. 1;

FIG. 6 is an isometric view of another form of irradiation cover;

FIG. 7 is an exploded plan view of another form of biological-study cage embodying the invention, having a removable watering means;

FIG. 8 is an enlarged fragmentary vertical section taken substantially along the line 8—8 of FIG. 7; and FIG. 9 is a fragmentary vertical section taken substantially along the line 9—9 of FIG. 8.

Figure 3:
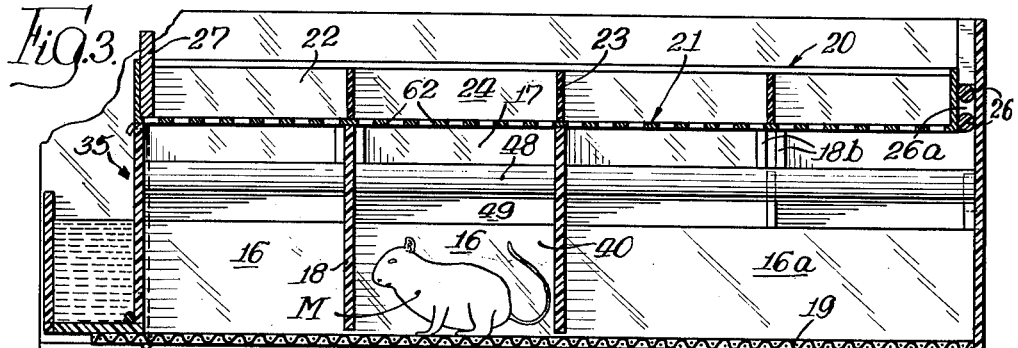
FIG. 3 is a vertical section taken substantially along the line 3—3 of FIG. 1 with a portion thereof broken away for facilitated illustration thereof and illustrating the disposition of an animal such as a mouse in one of the housing spaces.

In the exemplary embodiment of the invention as disclosed in FIGS. 1–5 of the drawing, a biological-study cage generally designated 10 is shown to comprise an enclosure generally designated 11 defined by a pair of side walls 12 and 13, a rear wall 14, and a bottom wall 15. A plurality of housing spaces 16 are defined within the enclosure 11 by means of a plurality of longitudinal divider walls 17 and a plurality of transverse divider walls 18. The bottom of each housing space 16 is defined by a screen floor 19 carried above bottom wall 15 on walls 12, 13 and 14.

Each housing space 16 is adapted to house one animal such as a mouse M, the illustrated cage 10 being arranged to provide twenty such spaces for housing twenty such mice. The top of the housing space is closed selectively by a feeding cover generally designated 20 as illustrated in FIG. 1 and an irradiation cover generally designated 120 as illustrated in FIG. 2. Feeding cover 20 includes a slotted closure plate 21 adapted to rest on the upper edges of the divider walls 17 and 18, and a plurality of longitudinal divider strips 22 and transverse divider strips 23 dividing the space above plate 21 into a plurality of feeder spaces 24 corresponding to the subjacent housing spaces. The feeding cover is laterally defined by a peripheral wall 25 abutting a pair of vertically spaced ribs 26 extending along the inner surface of enclosure walls 12, 14 and 13 adjacent the plane of the divider wall edges. A handle 27 is provided on the front of feeding closure 20 to facilitate installation and removal thereof.

The irradiation cover 120 is preferably formed of a radiation transmitting material, herein ⅛" thick Lucite (an acrylic resin plastic), and includes a peripheral edge portion 28 slidable in the channel 26a defined by the spaced ribs 26. The irradiation cover is provided with a plurality of access openings 29 arranged to correspond one each with each of the housing spaces 16. Each opening 29 is controlled by a closure 30 having a co-operating upper ⅛" annular flange 31 and a pair of lower ¼" laterally extending fingers 32 for locking the closure in place across the opening. The fingers are arranged to pass through the flat plane of the irradiation cover through complementary slots 33 (see FIG. 2) extending radially from the periphery of opening 29. The mid-portion of the closure defines a handle 34 for facilitated manipulation thereof in installation and removal.

Drinking water is provided to each of the housing spaces 16 herein by means of a reservoir 35 at the front of the cage extending between side walls 12 and 13. The reservoir includes a front wall 36, a bottom wall 37, and a rear wall 38 which extends upwardly to the plane of the bottom of the lowermost rib 26. The drinking water is distributed to each of the housing spaces 16 from reservoir 35 by means of four distribution troughs 40 each defined co-operatively by a right wall 41, a bottom wall 42 and a longitudinal dividing wall 17. A fifth distribution trough 43 is defined co-operatively by a right wall 44, a bottom wall 45 and enclosure left wall 13. Each of the distribution troughs extends from reservoir wall 38 to enclosure rear wall 14, water entering the distribution troughs from the reservoir through inlet openings 46 in the bottom of rear wall 38, and being discharged from the rear ends of the distribution troughs through openings 47 in the enclosure rear wall 14 at the plane of the top of the right walls 40 and 43.

Only limited access to the distribution troughs is provided from each housing space 16, to preclude the mice from moving bodily into the distribution troughs. More specifically, a canopy 48 is secured to the dividing walls to extend at an angle downwardly away from the longitudinal dividing walls 17 and define with the upper edge of the right walls 40 and 43 a narrow access opening 49. A continuous flow of drinking water is provided through the distribution troughs by suitable means (not shown) delivering water to the reservoir 35 and causing the water to flow therethrough outwardly through openings 47. In this way, a constant supply of fresh clean water is available to each mouse at all times. To preclude communication between adjacent housing spaces above the water in the distribution troughs, divider wall portions 63 are provided extending downwardly from the canopy 48 to the level of the upper edge of the right walls in the plane of the associated transverse divider walls 18.

Figure 4:
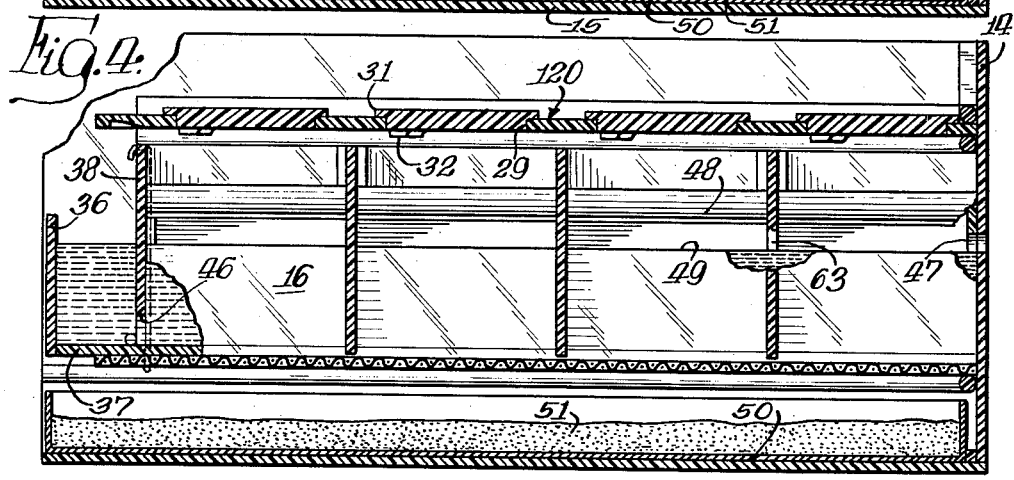
FIG. 4 is a vertical section taken substantially along the line 4—4 of FIG. 2, with a portion thereof broken away for facilitated illustration.
Figure 5:
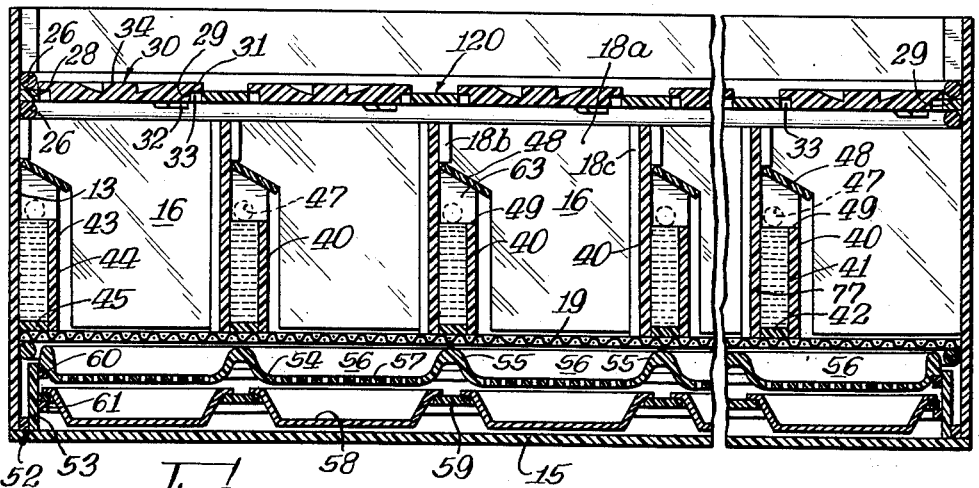
FIG. 5 is an enlarged fragmentary sectional view taken substantially along the line 5—5 of FIG. 2 and illustrating a modified form of excreta collecting means in the cage.

Another form of irradiation cover 220, illustrated in FIG. 6, comprises a plate formed of ⅛" thick Lucite having a plurality of small distributed ventilation holes 221 herein approximately ¼" in diameter.

Where analysis of the excreta of the mice is not required, a pan 50 is provided resting removably on bottom wall 15 for collecting the excreta and permitting facilitated disposal thereof. As shown in FIGS. 3 and 4, a layer 51 of sawdust or similar material may be placed in the pan for facilitated maintenance thereof.

Where metabolic studies are to be made of the animals, a modified form of excreta collecting means is provided, as best seen in FIG. 5. The metabolic-study collector generally designated 52 comprises a frame 53 carrying an upper foraminous tray 54 having a plurality of intersecting, upstanding ribs 55 defining a plurality of collecting spaces 56 corresponding one each with each of the housing spaces 16. The holes 57 of the tray 54 are relatively small to preclude the passage downwardly therethrough of the fecal material while readily permitting the flow downwardly therethrough of the urine which is collected in a plurality of cups 58 disposed one each below the collecting spaces 56 and carried removably on a suitable support 59. Tray 54 is removably associated with frame 53 in peripheral resting engagement with an inturned flange 60 on the frame and support 59 similarly supported on the frame 53 by a subjacent inturned flange 61. The frame 53 is, in turn, supported on the bottom wall 15 of the enclosure 11 and is slidable thereon for facilitated insertion and removal of the collector 52.

For facilitated maintenance and economy of construction, substantially the entire cage 10 may be formed of a suitable plastic material. Herein, floor 19 is formed of ¹⁄₁₆" thick galvanized hardware cloth with ¼" to ⅝" openings, and feeding cover plate 20 is formed of 26-gauge galvanized sheet iron provided with a plurality of ¼" by 1" slits 62. In the illustrated cage, the enclosure 11 is approximately 13½" deep by 15" wide by 6" high, the housing spaces 16 being approximately 3" deep by 3" wide by 3" high thereby providing ample space for the housing in each of an individual mouse.

As shown, each cage 10 defines twenty housing spaces 16 providing for the individual housing of twenty mice M. In certain instances, as where animals larger than mice are to be housed, it may be desirable to provide enlarged housing spaces. To this end, the front and rear transverse divider walls may be formed of individual sections 18a vertically slidable in channel-forming ribs 18b and 18c on the longitudinal divider walls 17 and side walls 12 and 13, permitting removal of the sections 18a when desired to provide housing spaces 16a as seen in FIG. 3, twice the size of housing spaces 16.

The feeding cover is normally disposed across the top of the housing spaces effectively retaining the mice in the respective housing spaces while providing suitable ventilation thereof. As each feeding space 24 is associated with only one housing space, the controlled feeding of each individual mouse is readily effected by placing a predetermined quantity of food on the plate 21 within each space 24. The mouse obtains the food by reaching upwardly through the openings 62 in the plate 21 and can obtain only the preselected quantity of food provided in the directly superjacent feeding space 24. Where analysis of the excreta of the mice is not required, the pan 50 is disposed below floor 19. Where metabolic studies are to be made, the collector 52 is substituted for the pan 50 and the excreta of each individual mouse is collected in the corresponding collecting spaces 56 and cups 58. The entire collector 52 may be removed when desired to permit analysis of the collected excreta; the removed collector may be reinstalled after suitable cleaning, or a replacement collector may be installed, for continued collection.

To irradiate the mice within cage 10, the feeding cover 20 is replaced by the irradiation cover 120. To effect this replacement, the feeding cover is raised slightly by means of handle 27 and the irradiation cover is slid peripherally through channel 26a directly below the feeding cover plate 21, thereby effectively retaining the mice in the housing space during the transfer. When the irradiation cover is fully installed, the feeding cover may be completely removed from the cage. The cage may then be transported to the place of irradiation where irradiation of the mice as desired may be effected through the cover 120.

Facilitated removal of the mice from housing spaces 16 or placement of the mice into housing spaces 16 is provided by the closures 30. Thus, to remove a mouse from the housing space, the associated closure 30 is turned by means of handle portion 34 to align the fingers 32 with the slots 33, permitting the closure to be moved upwardly from its position across the opening 29. The space 16 is then accessible for removal and replacement of mice.

Cage 10 provides an improved control of the individual animals being studied providing improved observation accuracy and maintained dosimetric conditions as of radiation. While providing such improved individual housing of the animals being studied, the cage provides facilitated maintenance permitting a single keeper to care for a colony of up to 1,500 mice in approximately four to six hours per day. The simple rugged construction of the cage permits facilitated sanitation including complete and thorough cleaning and washing of the entire cage structure when desired. In addition, the improved construction of the cage provides for a substantial number of housing spaces in an effectively minimized space. Illustratively, in the conventional cage structures wherein a plurality of mice are housed in a single cage, the housing of 1,500 mice has required approximately 150 cubic feet of space. By means of the use of a plurality of cage structures 10, 1,600 mice may be individually housed in 140 cubic feet of space. The rectangular configuration of the cage further lends itself to facilitated transportation, such as by means of multi-shelved push-carts. While a substantially increased concentration of the animals is effected within the over-all space, the improved sanitation provided by the cage structure 10 effectively minimizes cross-infection and resultant mortality.

Referring now to FIGS. 7–9, another form of biological-study cage generally designated 110 is shown to comprise a cage generally similar to cage 10, but having a removable watering means generally designated 112. The watering means includes a reservoir 135 carrying five elongated distribution troughs 140. The transverse divider walls 118 of the cage enclosure 111 are provided with openings 119 having a cross section corresponding to that of the troughs 140, as best seen in FIG. 9, permitting insertion of the troughs from the full line position of FIG. 7 to the dotted line position thereof wherein the troughs are accessible to the animals housed in the respective spaces 116. The troughs 140 may be fully separable from the longitudinal divider walls 117, side wall 113 and rear wall 114, and the reservoir may be fully separable from the front wall 138 of the enclosure. The rear wall 120 of each trough 140 is provided with a discharge opening 141 which is aligned with a corresponding discharge opening 147 in the enclosure rear wall 114 to provide an outlet for the water from the troughs when the watering means 112 is installed in the dotted line position of FIG. 7.

The clearance between the troughs and the enclosure walls is made small so that communication between the cages and egress from the enclosure are effectively precluded.

The simplified, economical structures of watering means 112 provides, by virtue of the ready removability thereof, for facilitated cleaning independently of the remainder of the cage. In all other respects, the cage 110 is similar and functions similarly to biological-study cage 10.

While we have shown and described certain embodiments of our invention, it is to be understood that it is capable of many modifictions. Changes, therefore, in the construction and arrangement may be made without departing from the spirit and scope of the invention as defined in the appended claims.

We claim:

1. A compartmentalized cage structure for maintaining individually a plurality of animals such as mice, comprising: a plurality of intersecting parallel vertical walls defining horizontal boundaries of a plurality of rows of horizontally related housing spaces, each space being suitable for housing one animal; floor means underlying said spaces including excrement collecting means for each of said spaces; removable cover means selectively extending over said plurality of spaces; a water supply reservoir adjacent one side of said structure; and fluid conducting means providing flow passages from the reservoir to each space and defining a trough portion in each housing space, said fluid conducting means including a water level maintaining means whereby the water in each trough is kept at substantially the same level as the water in the reservoir.

2. A compartmentalized cage structure for maintaining individually a plurality of animals such as mice, comprising: a plurality of intersecting vertical walls defining horizontal boundaries of a plurality of rows of horizontally related housing spaces, each space being suitable for housing one animal; floor means underlying said plurality of spaces; cover means overlying said plurality of spaces; a water supply reservoir adjacent one side of said structure; and fluid conducting means providing flow passages from the reservoir to each space and defining a trough portion in each housing space.

3. The cage structure of claim 2 wherein said fluid conducting means includes a portion of said vertical walls.

4. The cage structure of claim 2 wherein said reservoir and fluid conducting means comprise a unitary assembly removably associated with said walls.

5. The cage structure of claim 2 wherein said walls are provided with openings aligned in the direction of extent of said rows and said fluid conducting means comprises elongated troughs extending longitudinally seriatim through said openings.

6. The cage structure of claim 2 wherein said fluid conducting means includes a water level maintaining means whereby the water in each trough is kept at substantially the same level as the water in the reservoir.

7. The cage structure of claim 2 including means defining an overflow outlet from the troughs at a point remote from said reservoir.

8. A compartmentalized cage structure for maintaining individually a plurality of animals such as mice, comprising: a plurality of intersecting vertical walls defining horizontal boundaries of a plurality of rows of horizontally related housing spaces, each space being suitable for housing one animal; floor means underlying said plurality of spaces; cover means overlying said plurality of spaces; a water supply reservoir adjacent one side of said structure; fluid conducting means providing flow passages from the reservoir to each space and defining a trough portion in each housing space; and a guard spaced slightly above each trough permitting access by an animal in the housing space to water in the trough for drinking the same and precluding movement of the entire animal from the housing space into the trough.

9. A compartmentalized cage structure for maintaining individually a plurality of animals such as mice, comprising: a plurality of intersecting vertical walls defining horizontal boundaries of a plurality of rows of horizontally related housing spaces, each space suitable for housing one animal; floor means underlying said plurality of spaces including excrement collecting means for each of said spaces; cover means overlying said plurality of spaces; and water supply means providing drinking water to each housing space.

10. A compartmentalized cage structure for maintaining individually a plurality of animals such as mice, comprising: a plurality of intersecting vertical walls defining horizontal boundaries of a plurality of rows of horizontally related housing spaces, each space being suitable for housing one animal; floor means underlying said plurality of spaces, said floor means having at least one opening therein in each of said spaces for passing excreta of the animal housed therein; excreta collecting means for use as in making metabolic studies of the individual animals, including vertically spaced, upper and lower receivers subjacent each housing space, the upper receiver being foraminous to collect solid excreta and pass liquid excreta, and the lower receiver being arranged to collect the liquid excreta; cover means overlying said plurality of spaces; and a water supply means providing drinking water to each housing space.

11. The cage structure of claim 10 wherein said collecting means comprises a pair of trays extending under the plurality of housing spaces, each tray having means dividing the upper surface thereof into receptacles corresponding to said housing spaces.

12. The cage structure of claim 10 wherein the lower receiver comprises disposable filter material.

13. A compartmentalized cage structure for maintaining individually a plurality of animals such as mice, comprising: a plurality of intersecting vertical walls defining horizontal boundaries of a plurality of rows of horizontally related housing spaces, each space being suitable for housing one animal; floor means underlying said plurality of spaces; a plurality of covers selectively overlying said plurality of spaces, each cover including a plurality of openings, each space having at least one cover opening associated therewith; and a water supply means providing drinking water to each housing space.

14. The cage structure of claim 13 wherein a number of said walls are provided with means defining horizontally extending channels at the top thereof slidably selectively receiving the edge portions of said covers for movement of said covers in their central flat plane to and from the position thereof over said spaces.

15. The cage structure of claim 13 wherein one of said covers is provided with upstanding intersecting walls positionally corresponding to said vertical walls to define a plurality of spaces above said one cover corresponding directly to the housing spaces.

16. The cage structure of claim 13 wherein one opening to each space is large and permits movement therethrough of the animal to be housed in the space, and closure means are provided for selectively closing each such large opening.

17. The cage structure of claim 16 wherein one of said covers is formed of non-metallic material permitting effectively unimpeded radiation passage therethrough for facilitated radiation exposure of animals in said housing spaces.

References Cited in the file of this patent

UNITED STATES PATENTS

| | | |
|---|---|---|
| 2,593,161 | Manger et al. | Apr. 15, 1952 |
| 2,620,770 | Drake | Dec. 9, 1952 |
| 2,684,051 | Leblond et al. | July 20, 1954 |
| 2,769,426 | Bromley | Nov. 6, 1956 |
| 2,881,733 | Young et al. | Apr. 14, 1959 |